United States Patent
Fischer et al.

(10) Patent No.: US 8,799,692 B2
(45) Date of Patent: Aug. 5, 2014

(54) METHOD AND SYSTEM FOR NO BUFFERED TRAFFIC INDICATION FOR WIRELESS LOCAL AREA NETWORK (WLAN) POWER SAVE

(75) Inventors: Matthew J. Fischer, Mountain View, CA (US); Qi Wang, Sunnyvale, CA (US); Raymond Hayes, Los Gatos, CA (US)

(73) Assignee: Broadcom Corporation, Irvine, CA (US)

(*) Notice: Subject to any disclaimer, the term of this patent is extended or adjusted under 35 U.S.C. 154(b) by 379 days.

(21) Appl. No.: 12/888,344

(22) Filed: Sep. 22, 2010

(65) Prior Publication Data

US 2011/0072285 A1 Mar. 24, 2011

Related U.S. Application Data

(60) Provisional application No. 61/244,896, filed on Sep. 23, 2009.

(51) Int. Cl.
*G06F 1/32* (2006.01)
*G06F 15/16* (2006.01)
*G06F 15/173* (2006.01)
*G08C 17/00* (2006.01)
*H04H 20/71* (2008.01)

(52) U.S. Cl.
USPC ........... 713/320; 713/323; 713/324; 709/206; 709/227; 370/310; 370/311; 370/312; 455/343.2

(58) Field of Classification Search
CPC .... Y02B 60/1228; Y02B 60/34; Y02B 60/59; H04W 52/00; H04W 52/02; H04W 52/0219; H04W 52/0235; H04W 52/383; H04W 84/12; G06F 1/32; G06F 1/3203; G06F 1/3209; G06F 1/3234; G06F 1/325; G06F 1/3287; G06F 3/1221

USPC .......... 713/300, 310, 320, 323, 324; 709/206, 709/207; 370/310, 312, 318, 450, 454, 311; 455/343.2
See application file for complete search history.

(56) References Cited

U.S. PATENT DOCUMENTS

| RE40,032 E | 1/2008 | Van Bokhorst et al. |
| 2006/0025181 A1 | 2/2006 | Kalofonos et al. |

(Continued)

FOREIGN PATENT DOCUMENTS

EP 0615364 B1 1/2001

OTHER PUBLICATIONS

Notification of transmittal of the International Search Report and the Written Opinion of the International Searching Authority, or the Declaration, International Search Report, and Written Opinion of the International Searching Authority dated Nov. 29, 2010 in International Application No. PCT/US2010/049972.

*Primary Examiner* — Tanh Nguyen
(74) *Attorney, Agent, or Firm* — Garlick & Markison; Bruce E. Garlick

(57) ABSTRACT

Aspects in a method and system for no buffered traffic indication for wireless local area network (WLAN) power save may enable a peer communication device to determine a time duration for remaining in an active operating state based on communication with other peer communication devices. In one aspect, a given peer communication device may determine that it has no data to communicate to any of the remaining peer communication devices. The given communication device may communicate to each of the peer communication devices that there is no data to transmit to the peer communication device. Each of the peer communication devices may communicate that there is no data to transmit to the given peer communication device. Based on the communications, the given peer communication device may exit the active operating state and enter a low power operating state.

20 Claims, 8 Drawing Sheets

(56) References Cited

U.S. PATENT DOCUMENTS

| | | |
|---|---|---|
| 2006/0252443 A1 | 11/2006 | Sammour et al. |
| 2006/0285527 A1 | 12/2006 | Gao et al. |
| 2009/0196211 A1 | 8/2009 | Wentink |
| 2011/0072285 A1 * | 3/2011 | Fischer et al. ................ 713/320 |

* cited by examiner

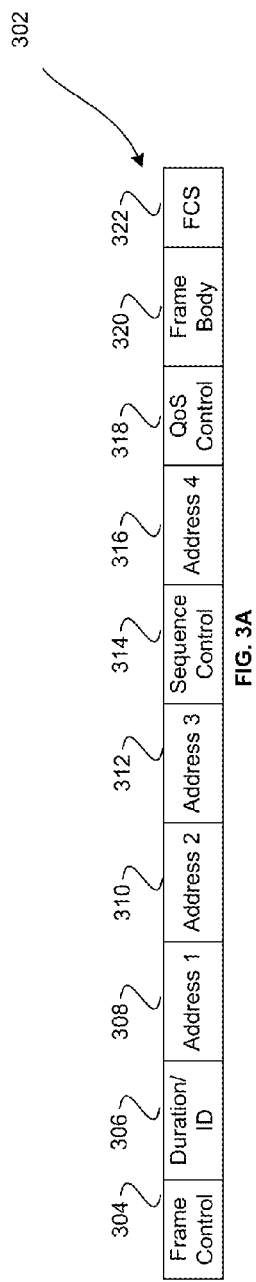
FIG. 3A
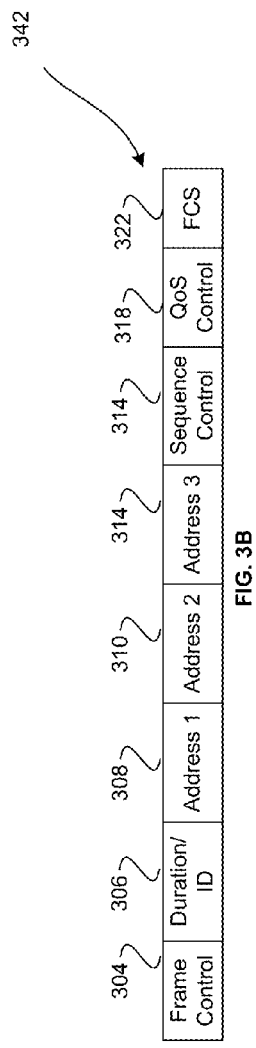
FIG. 3B
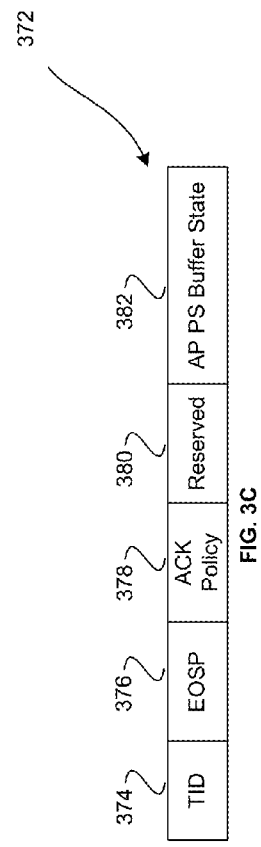
FIG. 3C
FIG. 3

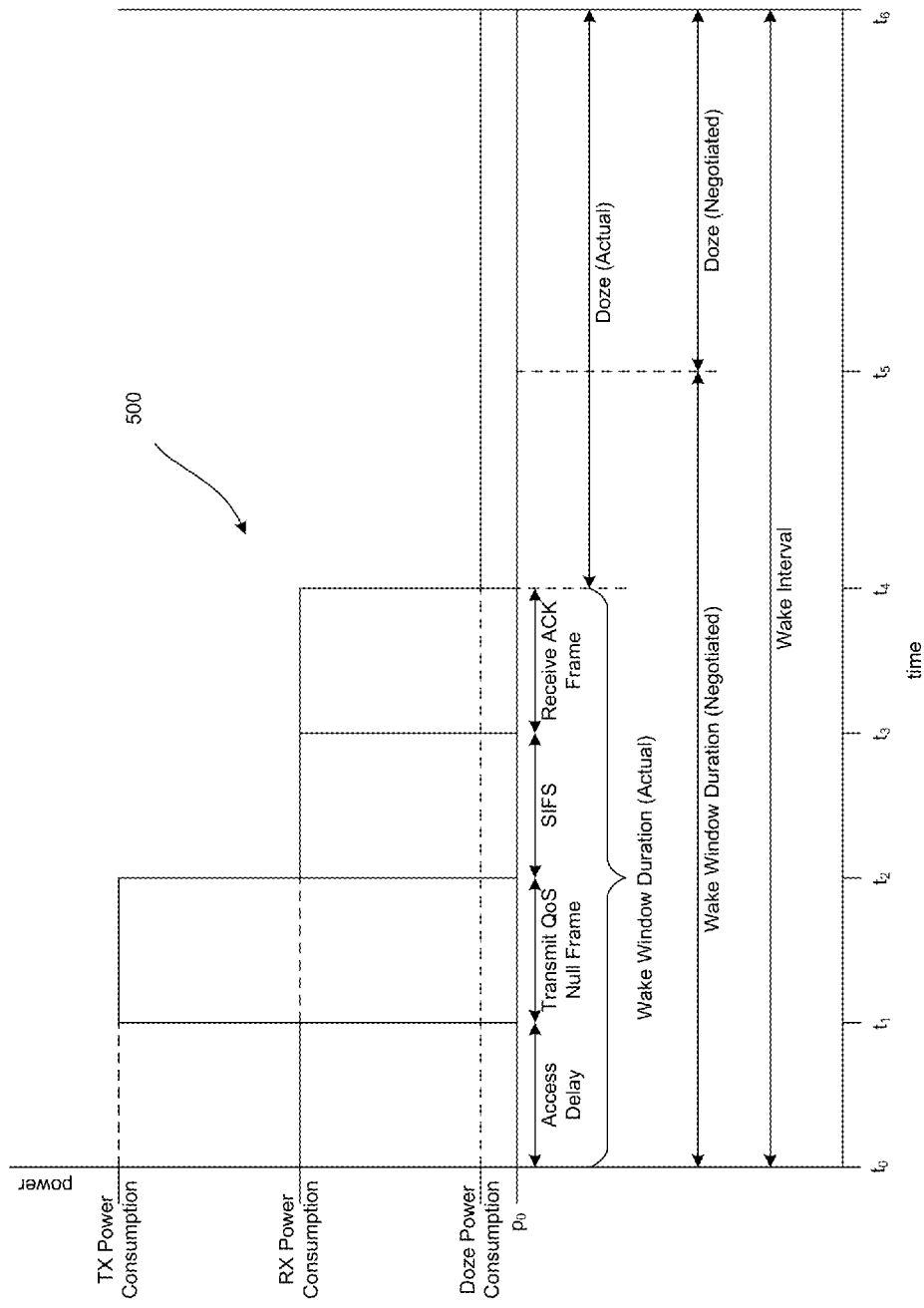

METHOD AND SYSTEM FOR NO BUFFERED TRAFFIC INDICATION FOR WIRELESS LOCAL AREA NETWORK (WLAN) POWER SAVE

CROSS-REFERENCE TO RELATED APPLICATIONS/INCORPORATION BY REFERENCE

This application makes reference to, claims priority to, and claims the benefit of U.S. Provisional Application Ser. No. 61/244,896, filed on Sep. 23, 2009, which is hereby incorporated herein by reference in its entirety.

FIELD OF THE INVENTION

Certain embodiments of the invention relate to communication networks. More specifically, certain embodiments of the invention relate to a method and system for no buffered traffic indication for WLAN power save.

BACKGROUND OF THE INVENTION

IEEE 802.11 describes a communication architecture, which may enable computing devices to communicate via wireless local area networks (WLANs). One of the building blocks for the WLAN is the basic service set (BSS). A BSS may comprise an access point (AP) and a plurality of computing devices, or stations (STA), which may communicate wirelessly via one or more RF channels within a coverage area. The span of a coverage area may be determined based on the distance over which a source STA may transmit data via an RF channel, which may be received by a destination STA.

Within a BSS, a STA may operate in two power management modes: an active mode (AM) and/or a power-save (PS) mode. When the STA is operating in an AM, the STA may be fully powered (within the capabilities of the power supply, for example) and may transmit and/or receive data. When the STA is operating in PS mode, the STA may operate in an active state, during which the STA may transmit and/or receive data, or the STA may enter a doze state during which it operates at lower power consumption (when compared to AM) and capabilities for transmitting and/or receiving data may be disabled. While a given STA is in the PS mode doze state, the given STA may generate data, which is to be transmitted to another STA. The given STA may store, or buffer, the data while the given STA is in PS mode doze state. Upon a subsequent exit from the PS mode doze state and entry into an active state, the given STA may transmit the buffered data to the other STA.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for no buffered traffic indication for wireless local area network (WLAN) power save, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3A is an illustration of an exemplary WLAN medium access control (MAC) frame format, in accordance with an embodiment of the invention.

FIG. 3B is an illustration of an exemplary WLAN QoS null frame format, in accordance with an embodiment of the invention.

FIG. 3C is an illustration of an exemplary QoS control field format, in accordance with an embodiment of the invention.

FIG. 5A is an illustration of an exemplary power state for a STA that sends a QoS null frame, in accordance with an embodiment of the invention.

DETAILED DESCRIPTION OF THE INVENTION

Figure 1:
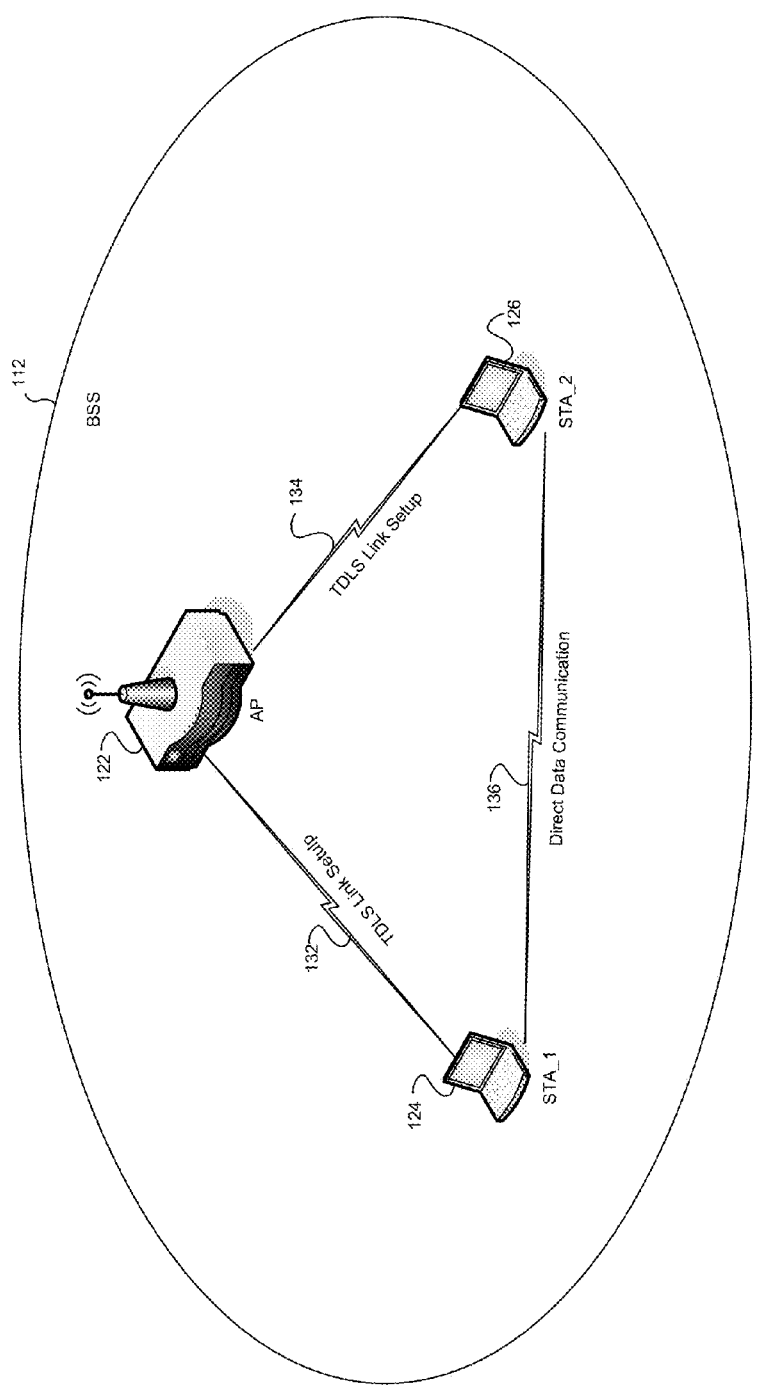
FIG. 1 is a block diagram of an exemplary system for initiation of no buffered traffic indication for WLAN power save mode based on direct data communication between stations (STAs) in a wireless local area network (WLAN) basic service set (BSS), in accordance with an embodiment of the invention.

Certain embodiments of the invention may be found in a method and system for no buffered traffic indication for wireless local area network (WLAN) power save. Various embodiments of the invention comprise a method and system which may be practiced in a network that comprises a coordinating communication device and a plurality of peer communication devices, wherein the peer communication devices establish a peer relationship within the network by individually communicating registration information with the coordinating communication device. Each of the associated peer communication devices may enter an active operating state, which enables the peer communication devices to transmit and/or receive data via a communication medium. Upon entering the active operating state, the peer communication devices communicate to determine whether any of the peer communication devices has data to transmit to one or more of the remaining peer communication devices. In the event that a given peer communication device determines that it has no data to transmit to any of the remaining peer communication devices and that none of the remaining peer communication devices have data to transmit it, then the given peer communication device may exit the active operating state and enter a low power operating state, which may disable the given peer communication device from transmitting and/or receiving data from any of the remaining peer communication devices.

In various embodiments of the invention, one or more of the peer communication devices within the network may exit the low power operating state and enter the active operating state at the start of a negotiated wake window time duration. The negotiated wake window time duration may comprise a maximum time duration during which a peer communication device continuously remains in the active operating state to listen for messages from other devices indicating a request for further communication. During the negotiated wake window time duration, each of the peer communication devices may individually determine whether it has stored data to transmit to one or more of the remaining peer communication devices within the network. In the event that a given peer communication device determines that there is data to transmit to one or more of the remaining peer communication devices, the given peer communication device may transmit the data to the one or more remaining peer communication devices during the negotiated wake window time duration. In the event that the given peer communication device determines that there is no data to transmit to any of the remaining peer communication devices, the given peer communication device may transmit a No-Data indication message to each of the one or more remaining peer communication devices.

Each of the remaining peer communication devices that receives a No-Data indication message from the given peer communication device may individually determine whether there is any data to transmit to the given peer communication device, which transmitted the No-Data indication message. In the event that a remaining peer communication device determines that there is no data to transmit to the given peer communication device, the remaining peer communication device may transmit a No-Data acknowledgment message to the given peer communication device, which comprises an indication that the remaining peer communication device has no data to transmit to the given peer communication device. In the event that a remaining peer communication device determines that there is data to transmit to the given peer communication device, the remaining peer communication device may transmit a No-Data acknowledgment message to the given peer communication device, which comprises an indication that the remaining peer communication device has data to transmit to the given peer communication device.

Based on received No-Data acknowledgment messages, the given peer communication may determine whether one or more remaining peer communication devices has data to transmit to the give peer communication device. In the event that the given peer communication device determines that none of the remaining peer communication devices has data to transmit to the given peer communication device, the given peer communication device may enter the low power operating state. In the event that the given peer communication device determines that one or more of the remaining peer communication devices has data to transmit to the given peer communication device, the given peer communication device may remain in the active operating state beyond the end of the negotiated wake window time duration to receive further expected messages from the one or more remaining peer communication devices. In the event that the given peer communication device is in the active operating state until at least the end of the negotiated wake window time duration, subsequent to the end of the negotiated wake window time duration, the given peer communication device may exit the active operating state and enter the low power operating state.

In the event that a given peer communication device determines that it has no data to transmit to any of the remaining peer communication devices, and receives a No-Data indication message from each of the remaining peer communication devices, the given peer communication device may transmit a No-Data acknowledgment message in response to each received No-Data indication message. Each transmitted No-Data acknowledgment message may comprise an indication that the given peer communication device has no data to transmit to the remaining peer communication device, which is the recipient of the No-Data acknowledgment message. Subsequent to transmitting the No-Data acknowledgment message to each of the remaining peer communication devices, the given peer communication device may enter the low power operating state.

In the event that a given peer communication device determines that it has data to transmit to one or more of the remaining peer communication devices, and receives a No-Data indication message from the one or more remaining peer communication devices, the given peer communication device may transmit a No-Data acknowledgment message in response to each received No-Data indication message. Each transmitted No-Data acknowledgment message may comprise an indication that the given peer communication device has data to transmit to the remaining peer communication device, which is the recipient of the No-Data acknowledgment message. Subsequent to transmitting the No-Data acknowledgment message to the one or more remaining peer communication devices, the given peer communication device may remain in the active operating state until at least the end of the negotiated wake window time duration.

In an exemplary embodiment of the invention, the network is a WLAN basic service set (BSS), the coordinating communication device is an access point (AP), and the peer communication devices are WLAN station devices (STAs). In the exemplary embodiment of the invention, the registration information communicated by each STA may comprise an association (or reassociation) message to the AP, wherein the association (or reassociation) message is a request by the STA to associate with the AP. The association (or reassociation) message may be referred to as a registration request. The AP may respond to the registration request from a given STA by establishing an association with the given STA. The association may be identified by an association identifier (AID). Each AID may be associated with the BSS, wherein the BSS may be identified by a BSS identifier (BSSID). A STA, which has joined the BSS in this manner may establish a peer relationship with another STA within the BSS. Peer STAs, which refers to STAs which have established a peer relationship, may then be able to communicate with each other directly and/or with the AP.

In an exemplary embodiment of the invention, the No-Data indication message may comprise a QoS Null frame. An exemplary No-Data indication acknowledgment message may comprise an acknowledgment (ACK) frame. An exemplary power-save (PS) mode comprises a doze state and an active state. A PS mode doze state may be referred to as a doze state and a PS mode active state may be referred to as an active state.

FIG. 1 is a block diagram of an exemplary system for initiation of no buffered traffic indication for WLAN power save mode based on direct data communication between stations (STAs) in a wireless local area network (WLAN) basic service set (BSS), in accordance with an embodiment of the invention. Referring to FIG. 1, there is shown BSS 112, which comprises AP 122 and a plurality of STAs: STA_1 124 and STA_2 126. STA 124 and AP 122 may communicate via radio frequency (RF) channel 132. STA 126 and AP 122 may communicate via RF channel 134. STA 124 and STA 126 may communicate via RF channel 136. RF channels 132, 134 and/or 136 may enable the transmission and/or reception of signals via a communication medium. In various embodiments of the invention, the communication medium may comprise wireless and/or wired communication media. AP 122, STA 124 and STA 126 may comprise suitable logic, circuitry and/or code, which may enable AP 122, STA 124 and/or STA 126 to perform the operations and/or functions described herein.

STA 124 and STA 126 may be peer communication devices within BSS 112. AP 122 may be a coordinating communication device within BSS 112. STA 124 may establish an association with AP 122 by communicating an association (or reassociation) message to AP 122. A message may also be referred to as a frame. The association with AP 122 may enable STA 124 to join BSS 112. Similarly, STA 126 may establish an association with AP 122 by communicating an association (or reassociation) message to AP 122. The association with AP 122 may enable STA 126 to join BSS 112. STA 124 and STA 126 may establish a direct communication link using the setup messages sent through AP 122. AP 122 may or may not know the direct link established between STA 124 and STA 126.

For the PS mode operation for the direct link, a negotiated wake window time duration may be established between STA 124 and STA 126.

For the PS mode operation for the direct link, a wake interval time duration may be established between STA 124 and STA 126. The wake interval time duration may comprise a time duration that begins with the start of a negotiated wake window time duration and the start of a subsequent negotiated wake window time duration. A negotiated doze time duration may comprise a time duration that begins with the end of a negotiated wake window time duration and ends with the start of a subsequent negotiated wake window time duration. In various embodiments of the invention, the negotiated doze time duration may comprise a minimum time duration during with a peer communication device continuously remains in the doze state. A sum of the negotiated wake window time duration and negotiated doze time duration may equal the wake interval time duration.

Peer STAs, STA 124 and STA 126, may establish RF channel 136. In an exemplary embodiment of the invention, STA 124 may communicate a tunneled direct link service (TDLS) setup message to AP 122 via RF channel 132. In response to the TDLS setup message received via RF channel 132, AP 122 may communicate a TDLS setup message to STA 126 via RF channel 134. In the TDLS setup message communicated via RF channel 134, STA 126 may receive indication that STA 124 has requested that RF channel 136 be established to enable direct data communication between STA 124 and STA 126. STA 126 may send a response message to AP 122 via RF channel 134 in response to the TDLS setup message communicated via RF channel 134. In response to the response message received by AP 122 via RF channel 134, AP 122 may communicate a response message to STA 124 via RF channel 132. In response to the response message received by STA 124 via RF channel 132, STA 124 and STA 126 may establish RF channel 136 to enable direct data communication between STA 124 and STA 136. In an exemplary embodiment of the invention, the response message comprises a TDLS response message. Various embodiments of the invention may be practiced when various methods are utilized that enable direct communication between peer communication devices, for example STA 124 and STA 126 with an established TDLS link, or peer devices in other deployment topologies (e.g., in a mesh network).

Various embodiments of the invention may comprise a method and system by which peer communication devices STA 124 and STA 126 may determine an actual wake window duration based on whether the peer communication devices have data to exchange via a direct data communication link, for example RF channel 136. At the beginning of a negotiated wake window time duration, STA 124 and STA 126 may each exit the doze state and enter the active state. STA 124 and STA 126 may determine whether there is data to be exchanged via RF channel 136 during a beginning portion of the negotiated wake window time duration. In the event that STA 124 determines that it has no data to transmit to STA 126, STA 124 may transmit a QoS null frame to STA 126 via RF channel 136. In the event that STA 124 determines that it has data to transmit to STA 126, STA 124 may transmit the data to STA 126 via RF channel 136.

In the event that STA 126 receives a QoS null frame from STA 124, STA 126 may determine whether it has data to transmit to STA 124. In the event that STA 126 determines that it has data to transmit to STA 124, STA 126 may transmit an ACK frame to STA 124 via RF channel 136. The ACK frame may comprise an indication that STA 126 has data to transmit to STA 124. Upon receipt of the ACK frame, STA 124 may remain in the active state until at least the end of the negotiated wake window time duration. STA 126 may subsequently transmit data to STA 124 via RF channel 136. STA 126 may remain in the active state until at least the end of the negotiated wake window time duration.

In the event that STA 126 determines that it has no data to transmit to STA 126, subsequent to receiving the QoS null frame from STA 124, STA 126 may transmit an ACK frame to STA 124 via RF channel 136. The ACK frame may comprise an indication that STA 126 has no data to transmit to STA 124. Subsequent to transmitting the ACK frame, STA 126 may exit the active state and enter the doze state. Subsequent to receipt of the ACK frame, STA 124 may exit the active state and enter the doze state. The time duration from the beginning of the negotiated wake window time duration to the time when STA 124 and/or STA 126 exits the active state and enters the doze state comprises a time duration referred to as an actual wake window duration. In various embodiments of the invention, the actual wake window duration may comprise a shorter time duration than does the negotiated wake window time duration. Accordingly, an actual doze duration may comprise a longer time duration than does the negotiated doze time duration. In various embodiments of the invention, the sum of the actual wake window duration and the actual doze duration may equal the wake interval time duration.

Various embodiments of the invention enable peer communication devices, for example STA 124 and STA 126, to reduce power consumption by performing an early exit from the active state when there peer communication devices determine that there is no data to exchange between the peer communication devices. In some conventional WLAN systems, STA 124 and STA 126 may remain in the active state for the negotiated wake window time duration regardless of whether STA 124 and STA 126 have any data to exchange.

Figure 2:
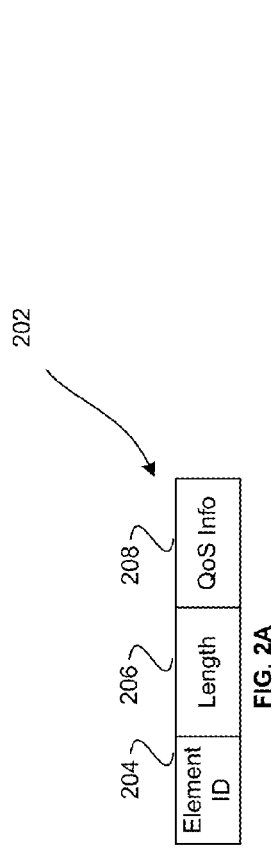
FIG. 2A is an illustration of an exemplary quality of service (QoS) capability information element (IE) format, in accordance with an embodiment of the invention.
FIG. 2B is an illustration of an exemplary QoS information field format, in accordance with an embodiment of the invention.
Figure 2:
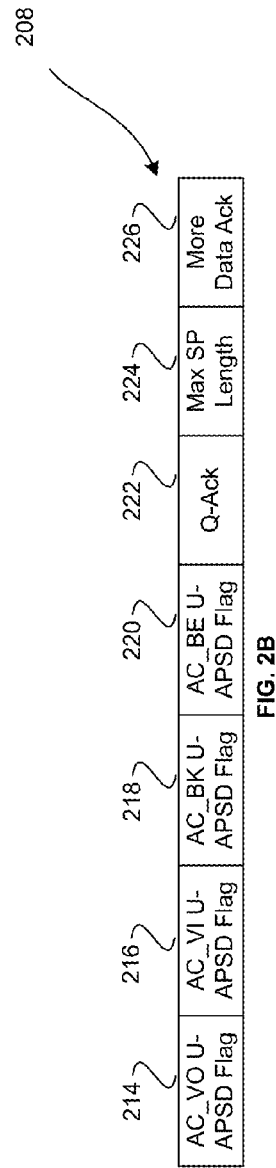

STA 124 may communicate to STA 126 that it is capable to engage in a direct data communication with STA 126 to determine when to enter the doze state, in accordance with an embodiment of the invention. FIG. 2A is an illustration of an exemplary quality of service (QoS) capability information element (IE) format, in accordance with an embodiment of the invention. Referring to FIG. 2A, there is shown an QoS IE 202. In various embodiments of the invention, STA 124 may utilize the QoS capability IE 202 to communicate its ability to determine when to enter the doze state based on communication with STA 126. The QoS capability IE 202 may comprise an element ID field 204, a length field 206 and a QoS info field 208. Exemplary element ID 204, length 206 and QoS info 208 fields may be generally described in one or more IEEE 802.11 standard and/or draft standard documents. In an exemplary embodiment of the invention, the element ID 204, length 206 and QoS info 208 fields may each comprise a plurality of bits that form an octet. In various embodiments of the invention, STA 124 may utilize the QoS capability IE 202 to communicate its ability to determine when to enter the doze state based on communication with STA 126. In various embodiments of the invention, the QoS info field 208 may comprise an indicator value, which may be set to a value by STA 124 to indicate its ability to determine when to enter the doze state based on communication with STA 126. After setting the indicator value in the QoS info field 208, STA 124 may transmit a plurality of frames, each of which may comprise the QoS capability IE 202. Exemplary frames, which may comprise the QoS capability IE 202 include beacon frames, association frames, reassociation frames, TDLS set up request frames and TDLS response frames. A frame transmitted by STA 124 may be received by AP 122 and/or STA 126. Upon receipt of the frame, AP 122 and/or STA 126 may inspect the QoS info field 208 in the received frame to determine whether STA 124 is capable to determine when to enter the doze state based on communication with STA 126.

FIG. 2B is an illustration of an exemplary QoS information field format, in accordance with an embodiment of the invention. FIG. 2B is an illustration of an exemplary QoS info field 208, which is presented in FIG. 2A. Referring to FIG. 2B, the QoS info field 208 may comprise an AC_VO U-APSD flag field 214, an AC_VI U-APSD flag field 216, an AC_BK U-APSD flag field 218, an AC_BE U-APSD flag field 220, a Q-Ack field 222, a max SP length field 224 and a more data Ack field 226. Exemplary AC_VO U-APSD flag 214, AC_VI U-APSD flag 216, AC_BK U-APSD flag 218, AC_BE U-APSD flag 220, Q-Ack 222, max SP length 224 and more data Ack 226 fields may be generally described in one or more IEEE 802.11 standard and/or draft standard documents. In an exemplary embodiment of the invention, the AC_VO U-APSD flag 214, AC_VI U-APSD flag 216, AC_BK U-APSD flag 218, AC_BE U-APSD flag 220, Q-Ack 222, max SP length 224 and more data Ack 226 fields may each comprise a single bit. In various embodiments of the invention, the more data Ack field 226 may comprise an indicator value, which may be set to a value by STA 124 to indicate its ability to determine when to enter the doze state based on communication with STA 126. In an exemplary embodiment of the invention, STA 124 may set a binary value equal to 1 within the more data Ack field 226 to indicate its ability to determine when to enter the doze state based on communication with STA 126. In the event that STA 124 is not capable to determine when to enter the doze state based on communication with STA 126, STA 124 may set a binary value equal to 0 within the more data Ack field 226 to indicate its inability to determine when to enter the doze state based on communication with STA 126.

STA 124 may determine that it has no data to transmit to STA 126 upon entering the active state at the beginning of a negotiated wake window time duration. Based on this determination, STA 124 may transmit a frame to STA 126 via RF channel 136. The transmitted frame may enable STA 124 to communicate to STA 126 that STA 124 has no data to transmit to STA 126. FIG. 3A is an illustration of an exemplary WLAN medium access control (MAC) frame format, in accordance with an embodiment of the invention. Referring to FIG. 3A, there is shown an exemplary MAC frame 302, which comprises a frame control field 304, a duration/ID field 306, an address_1 field 308, an address_2 field 310, an address_3 field 312, a sequence control field 314, an address_4 field 316, a QoS control field 318, a frame body field 320 and an FCS field 322. Exemplary frame control 304, duration ID 306, address_1 308, address_2 310, address_3 312, sequence control 314, address_4 316, QoS control 318, frame body 320 and FCS 322 fields may be generally described in one or more IEEE 802.11 standard and/or draft standard documents.

In various embodiments of the invention, STA 124 may utilize the frame control 304 and QoS control 318 fields in frames transmitted by STA 124 to STA 126 to communicate to STA 126 that STA 124 has no data to transmit to STA 126. In an exemplary embodiment of the invention, the frames transmitted by STA 124 to STA 126 may comprise QoS null frames. In various embodiments of the invention, frame control field 304 may comprise one or more indicator values, which may be set by STA 124 to indicate that the MAC frame 302 comprises a QoS null frame. The QoS control field 318 may comprise one or more indicator values, which may be set by STA 124 to communicate to the recipient of the QoS null frame, STA 126, that STA 124 has requested that STA 126 transmit an ACK frame in response to the received QoS null frame.

FIG. 3B is an illustration of an exemplary WLAN QoS null frame format, in accordance with an embodiment of the invention. Referring to FIG. 3B there is shown a QoS null frame 342. The QoS null frame 342 shown in FIG. 3B indicates field from the MAC frame 302, which are utilized in a QoS null frame. The QoS null frame 342 comprises a frame control field 304, a duration/ID field 306, an address_1 field 308, an address_2 field 310, an address_3 field 312, a sequence control field 314, a QoS control field 318 and an FCS field 322.

Figure 4:
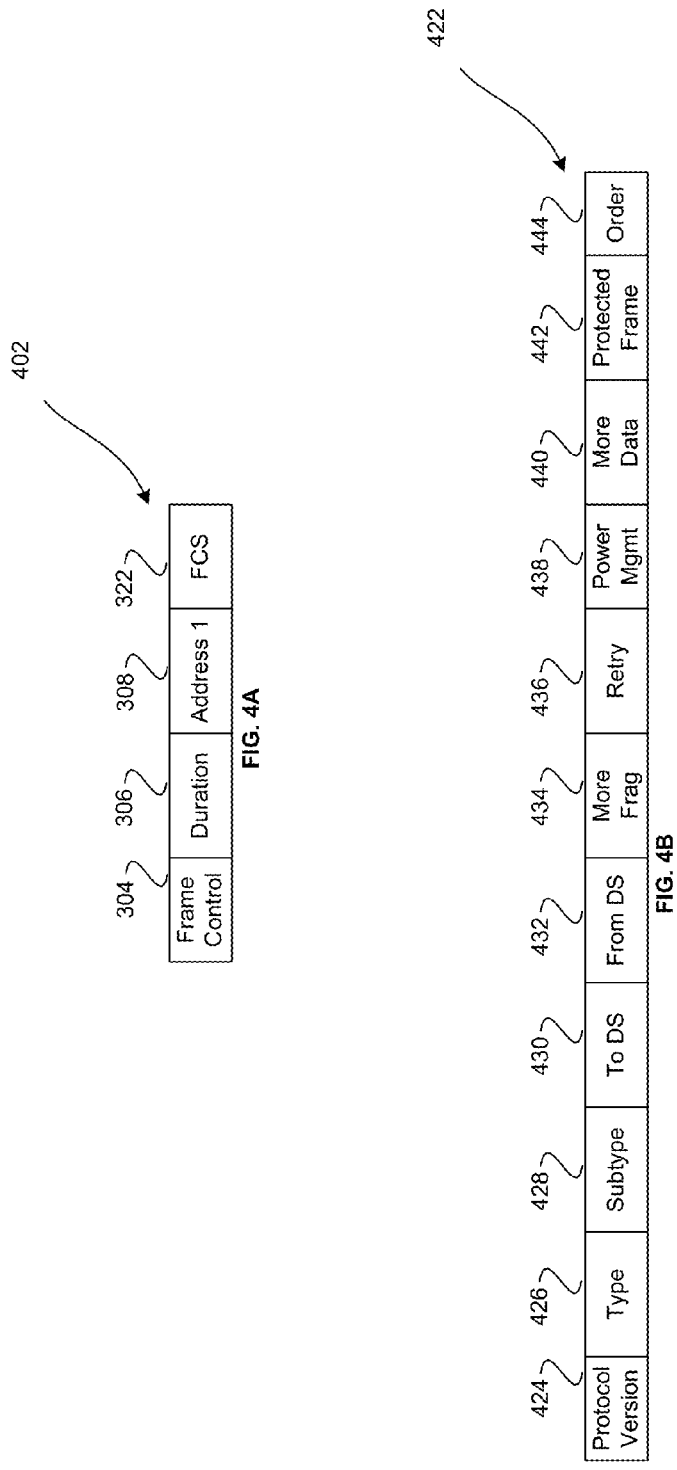
FIG. 4A is an illustration of an exemplary acknowledgment (ACK) frame format, in accordance with an embodiment of the invention.
FIG. 4B is an illustration of an exemplary frame control field format, in accordance with an embodiment of the invention.

FIG. 4B is an illustration of an exemplary frame control field format, in accordance with an embodiment of the invention. FIG. 4B is an illustration of an exemplary frame control field 304, which is presented in FIG. 3A. Referring to FIG. 4B, there is shown a frame control field 422. The frame control field 422 comprises a protocol version subfield 424, a type subfield 426, a subtype subfield 428, a to DS subfield 430, a from DS subfield 432, a more frag subfield 434, a retry subfield 436, a power mgmt subfield 438, a more data subfield 440, a protected frame subfield 442 and an order subfield 444. Exemplary protocol version 424, type 426, subtype 428, to DS 430, from DS 432, more frag 434, retry 436, power mgmt 438, more data 440, protected frame 442 and order 444 subfields may be generally described in one or more IEEE 802.11 standard and/or draft standard documents.

In various embodiments of the invention, type subfield 426 may comprise 2 bits, subtype subfield 428 may comprise 4 bits and more data subfield 440 may comprise a single bit. In an exemplary embodiment of the invention, STA 124 may indicate that a transmitted frame comprises a QoS null frame 342 by setting a 2-bit binary value of 10 within type subfield 426 and a 4-bit binary value of 1100 within subtype subfield 428. In addition, STA 124 may set a binary value of 0 within more data subfield 440.

FIG. 3C is an illustration of an exemplary QoS control field format, in accordance with an embodiment of the invention. FIG. 3C is an illustration of an exemplary QoS control field 318, which is presented in FIG. 3A. Referring to FIG. 3C, there is shown a QoS control field 372. The QoS control field 372 comprises a TID subfield 374, an EOSP subfield 376, an ACK policy subfield 378, a reserved subfield 380 and an AP PS buffer state subfield 382. Exemplary TID 374, EOSP 376, ACK policy 378, reserved 380 and AP PS buffer state 382 subfields may be generally described in one or more IEEE 802.11 standard and/or draft standard documents.

In various embodiments of the invention, EOSP subfield 376 may comprise a single bit and AC policy subfield 378 may comprise 2 bits. In an exemplary embodiment of the invention, STA 124 may indicate that an ACK frame is expected from STA 126 in response to the transmitted QoS null frame 342 by setting a 2-bit binary value of 00 within ACK policy subfield 378. In addition, STA 124 may set a binary value of 0 within EOSP subfield 376.

FIG. 4A is an illustration of an exemplary acknowledgment (ACK) frame format, in accordance with an embodiment of the invention. Referring to FIG. 4A there is shown an ACK frame 402. ACK frame 402 shown in FIG. 4A indicates fields from MAC frame 302, which are utilized in an ACK frame. ACK frame 402 comprises a frame control field 304, a duration field 306, an address_1 field 308 and an FCS field 322. Within ACK frame 402, address_1 field 308 may be referred to as a receiving address.

In various embodiments of the invention, STA 126 may transmit ACK frame 402 via RF channel 136 in response to receiving QoS null frame 342 from STA 124. In an exemplary embodiment of the invention, STA 126 may indicate that a transmitted frame comprises an ACK frame 402 by setting a 2-bit binary value of 01 within type subfield 426 and a 4-bit binary value of 1101 within subtype subfield 428.

In various embodiments of the invention, STA 126 utilizes the ACK frame 402 to communicate that it has no data to transmit to STA 124. In an exemplary embodiment of the invention, STA 126 may indicate that it has no data to transmit by setting a binary value of 0 within more data subfield 440. In the event that STA 126 determines that it has data to transmit to STA 124, in an exemplary embodiment of the invention, STA 126 may communicate that it has data to transmit to STA 124 by setting a binary value of 1 within more data subfield 440.

In the event that STA 126 transmits an ACK frame 402 in which the more data subfield 440 comprises a binary value of 0, STA 126 may enter the doze state subsequent to transmitting ACK frame 402 to STA 124 via RF channel 136. In various embodiments of the invention, STA 126 may enter the doze state prior to the end of the current negotiated wake window time duration. However, in the event that there are additional STAs within BSS 112, STA 126 may remain in the active state to determine whether there is data to exchange with any one of the remaining peer STAs within BSS 112. In various embodiments of the invention, STA 126 may make this determination for each individual remaining peer STA by utilizing a method and system described herein. In the event that STA 126 determines that there is no data to exchange with any of the remaining peer STAs, STA 126 may enter the doze state.

In the event that STA 126 transmits an ACK frame 402 in which the more data subfield 440 comprises a binary value of 1, STA 126 may subsequently transmit data to STA 124 via RF channel 136. In this event, STA 126 may remain in the active state until at least the end of the current negotiated wake window time duration.

In the event that STA 126 receives data from STA 124 via RF channel 136, STA 126 may remain in the active state until at least the end of the current negotiated wake window time duration.

In various embodiments of the invention, in the event that STA 124 transmits a QoS null frame 342 to STA 126 and receives an ACK frame 402 from STA 126 in response, STA 124 may determine whether to remain in the active state based on the contents of the received ACK frame 402. In an exemplary embodiment of the invention, in the event that the ACK frame 402 comprises a binary value of 0 within the more data subfield 440, STA 124 may exit the active state and enter the doze state. In various embodiments of the invention, STA 124 may enter the doze state prior to the end of the current negotiated wake window time duration. However, in the event that there are additional STAs within BSS 112, STA 124 may remain in the active state to determine whether there is data to exchange with any one of the remaining peer STAs within BSS 112. In various embodiments of the invention, STA 124 may make this determination for each individual remaining peer STA by utilizing a method and system described herein. In the event that STA 124 determines that there is no data to exchange with any of the remaining peer STAs, STA 124 may enter the doze state.

In an exemplary embodiment of the invention, in the event that received ACK frame 402 comprises a binary value of 1 within more data subfield 440, STA 124 may remain in the active state until at least the end of the current negotiated wake window time duration.

FIG. 5A is an illustration of an exemplary power state for a STA that sends a QoS null frame, in accordance with an embodiment of the invention. Referring to FIG. 5A, there is shown a power state graph 500. Power state graph 500 shows power levels, as indicated on the vertical axis, as a function of time, as indicated on the horizontal axis. Power levels are indicated in power state graph 500 relative to a baseline power level $p_0$. In various embodiments of the invention $p_0=0$. In an exemplary embodiment of the invention, power state graph 500 represents power levels for STA 124. The exemplary narrative presented in FIG. 5A is one in which STA 124 enters the active state and transmits a QoS null frame to STA 126. In response, STA 126 transmits an ACK frame to STA 124. In the ACK frame, STA 126 indicates that it has no data to transmit to STA 124. Subsequent to receipt of the ACK frame, STA 124 enters the doze state.

Referring again to FIG. 5A, a negotiated wake window duration may begin at time instant $t_0$. The negotiated wake window duration is represented in FIG. 5A as a Wake Window Duration (Negotiated) time duration. As shown in FIG. 5A, the Wake Window Duration (Negotiated) time duration begins at time instant $t_0$ and ends at time instant $t_5$. STA 124 may determine that it has no data to transmit to STA 126. At time instant $t_0$ STA 124 may attempt to gain access to a communication medium to enable the transmission of signals. The time duration during which STA 124 may attempt to gain access to the communication medium is represented in FIG. 5A as an Access Delay time duration. As shown in FIG. 5A, the Access Delay time duration begins at time instant $t_0$ and ends at time instant $t_1$. During the Access Delay time duration, the power level for STA 124 may be represented in FIG. 5A by power level RX Power Consumption.

After gaining access to the communication medium, subsequent to time instant $t_1$, STA 124 may transmit a QoS null frame to STA 126. The time duration during which STA 124 may transmit the QoS null frame is represented in FIG. 5A as a Transmit QoS Null Frame time duration. As shown in FIG. 5A, the Transmit QoS Null Frame time duration begins at time instant $t_1$ and ends at time instant $t_2$. During the Transmit QoS Null Frame time duration, the power level for STA 124 may be represented in FIG. 5A by power level TX Power Consumption.

After transmitting the QoS null frame, subsequent to time instant $t_2$, STA 124 may wait for a determined time interval before expecting to receive an ACK frame in response to the transmitted QoS null frame. This wait time duration is represented in FIG. 5A as a SIFS (short interframe space) time duration. As shown in FIG. 5A, the SIFS time duration begins at time instant $t_2$ and ends at time instant $t_3$. During the SIFS time duration, the power level for STA 124 may be represented in FIG. 5A by power level RX Power Consumption.

Following the SIFS time duration, subsequent to time instant $t_3$, STA 124 may receive an ACK frame. The time duration during which STA 124 may receive the ACK frame is represented in FIG. 5A as a Receive ACK Frame time duration. As shown in FIG. 5A, the Receive ACK Frame time duration begins at time instant $t_3$ and ends at time instant $t_4$. During the Receive ACK Frame time duration, the power level for STA 124 may be represented in FIG. 5A by power level RX Power Consumption.

Following receipt of the ACK frame, subsequent to time instant $t_4$, STA 124 may enter the doze state. The actual wake window time duration, during which STA 124 is in the active state, is represented in FIG. 5A as a Wake Window Duration (Actual) time duration. As shown in FIG. 5A, the Wake Window Duration (Actual) time duration begins at time instant $t_0$ and ends at time instant $t_4$. Upon entering the doze state, the power level for STA 124 may be represented in FIG. 5A by power level Dose Power Consumption.

Following time instant $t_4$, STA 124 may remain in the doze state until the end of the current wake interval time duration. The time duration during which STA 124 remains in the doze state is represented in FIG. 5A as a Doze (Actual) time duration. As shown in FIG. 5A, the Doze (Actual) time duration begins at time instant $t_4$ and ends at time instant $t_6$. The current wake interval time duration is represented in FIG. 5A as a Wake Interval. As shown in FIG. 5A, the Wake Interval begins at time instant $t_0$ and ends at time instant $t_6$. Following time instant $t_6$, a subsequent wake interval time duration may begin and STA 124 may exit the doze state and enter the active state.

In various embodiments of the invention, the actual wake window time duration may comprise a shorter time duration than does the negotiated wake window time duration. Accordingly, in various embodiments of the invention, the communication between STA 124 and STA 126 via RF channel 136 may enable STA 124 to consume less power during the wake interval than would be the case if STA 124 remained in the active state throughout the negotiated wake window time duration.

Figure 5B:
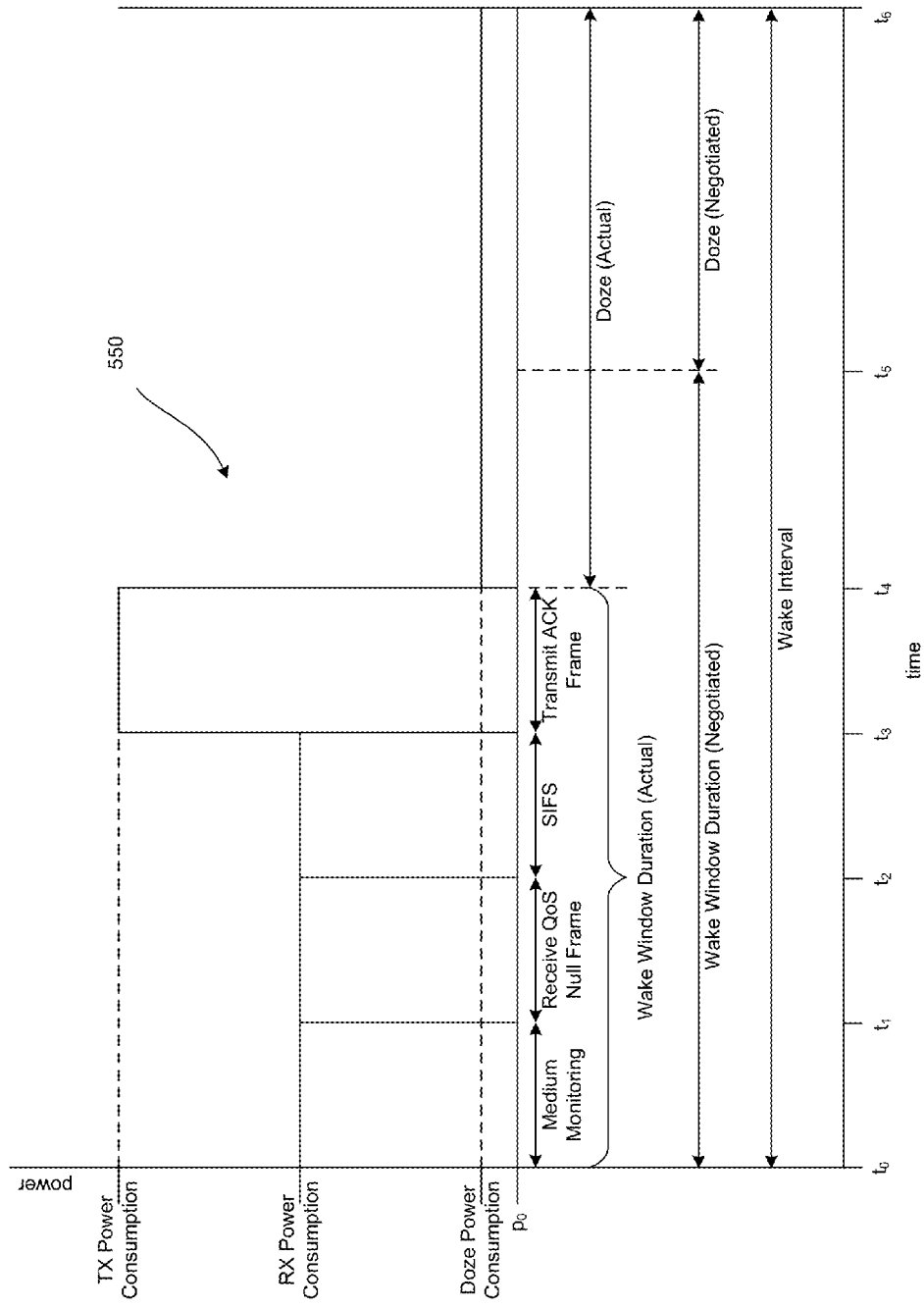
FIG. 5B is an illustration of an exemplary power state for a STA that sends an ACK frame, in accordance with an embodiment of the invention.

FIG. 5B is an illustration of an exemplary power state for a STA that sends an ACK frame, in accordance with an embodiment of the invention. Referring to FIG. 5B, there is shown a power state graph 550. Power state graph 550 shows power levels, as indicated on the vertical axis, as a function of time, as indicated on the horizontal axis. Power levels are indicated in power state graph 550 relative to a baseline power level $p_0$. In various embodiments of the invention $p_0=0$. In an exemplary embodiment of the invention, power state graph 550 represents power levels for STA 126. The exemplary narrative presented in FIG. 5B is one in which STA 126 enters the active state and receives a QoS null frame from STA 124. In response, STA 126 transmits an ACK frame to STA 124. In the ACK frame, STA 126 indicates that it has no data to transmit to STA 124. Subsequent to transmission of the ACK frame, STA 126 enters the doze state.

Referring again to FIG. 5B, a negotiated wake window duration may begin at time instant $t_0$. The negotiated wake window duration is represented in FIG. 5B as a Wake Window Duration (Negotiated) time duration. As shown in FIG. 5B, the Wake Window Duration (Negotiated) time duration begins at time instant $t_0$ and ends at time instant $t_5$. STA 126 may determine that it has no data to transmit to STA 124. At time instant $t_0$ STA 126 may monitor a communication medium to enable the reception of signals. The time duration during which STA 126 may monitor the communication medium is represented in FIG. 5B as a Medium Monitoring time duration. As shown in FIG. 5B, the Medium Monitoring time duration begins at time instant $t_0$ and ends at time instant $t_1$. During the Medium Monitoring time duration, the power level for STA 126 may be represented in FIG. 5B by power level RX Power Consumption.

Following the Medium Monitoring time duration, subsequent to time instant $t_1$, STA 126 may receive a QoS null frame from STA 124. The time duration during which STA 126 may receive the QoS null frame is represented in FIG. 5B as a Receive QoS Null Frame time duration. As shown in FIG. 5B, the Receive QoS Null Frame time duration begins at time instant $t_1$ and ends at time instant $t_2$. During the Receive QoS Null Frame time duration, the power level for STA 126 may be represented in FIG. 5B by power level RX Power Consumption.

After receiving the QoS null frame, subsequent to time instant $t_2$, STA 126 may wait for a determined time interval before transmitting an ACK frame to STA 124 in response to the received QoS null frame. This wait time duration is represented in FIG. 5B as a SIFS time duration. As shown in FIG. 5B, the SIFS time duration begins at time instant $t_2$ and ends at time instant $t_3$. During the SIFS time duration, the power level for STA 126 may be represented in FIG. 5B by power level RX Power Consumption.

Following the SIFS time duration, subsequent to time instant $t_3$, STA 126 may transmit an ACK frame to STA 124 via RF channel 136. The time duration during which STA 126 may transmit the ACK frame is represented in FIG. 5B as a Transmit ACK Frame time duration. As shown in FIG. 5B, the Transmit ACK Frame time duration begins at time instant $t_3$ and ends at time instant $t_4$. During the Transmit ACK Frame time duration, the power level for STA 126 may be represented in FIG. 5B by power level TX Power Consumption.

Following transmission of the ACK frame, subsequent to time instant $t_4$, STA 126 may enter the doze state. The actual wake window time duration, during which STA 126 is in the active state, is represented in FIG. 5B as a Wake Window Duration (Actual) time duration. As shown in FIG. 5B, the Wake Window Duration (Actual) time duration begins at time instant $t_0$ and ends at time instant $t_4$. Upon entering the doze state, the power level for STA 126 may be represented in FIG. 5B by power level Dose Power Consumption.

Following time instant $t_4$, STA 12B may remain in the doze state until the end of the current wake interval time duration. The time duration during which STA 126 remains in the doze state is represented in FIG. 5B as a Doze (Actual) time duration. As shown in FIG. 5B, the Doze (Actual) time duration begins at time instant $t_4$ and ends at time instant $t_6$. The current wake interval time duration is represented in FIG. 5B as a Wake Interval. As shown in FIG. 5B, the Wake Interval begins at time instant $t_0$ and ends at time instant $t_6$. Following time instant $t_6$, a subsequent wake interval time duration may begin and STA 126 may exit the doze state and enter the active state.

In various embodiments of the invention, the actual wake window time duration may comprise a shorter time duration than does the negotiated wake window time duration. Accordingly, in various embodiments of the invention, the communication between STA 124 and STA 126 via RF channel 136 may enable STA 126 to consume less power during the wake interval than would be the case if STA 126 remained in the active state throughout the negotiated wake window time duration.

Figure 6:
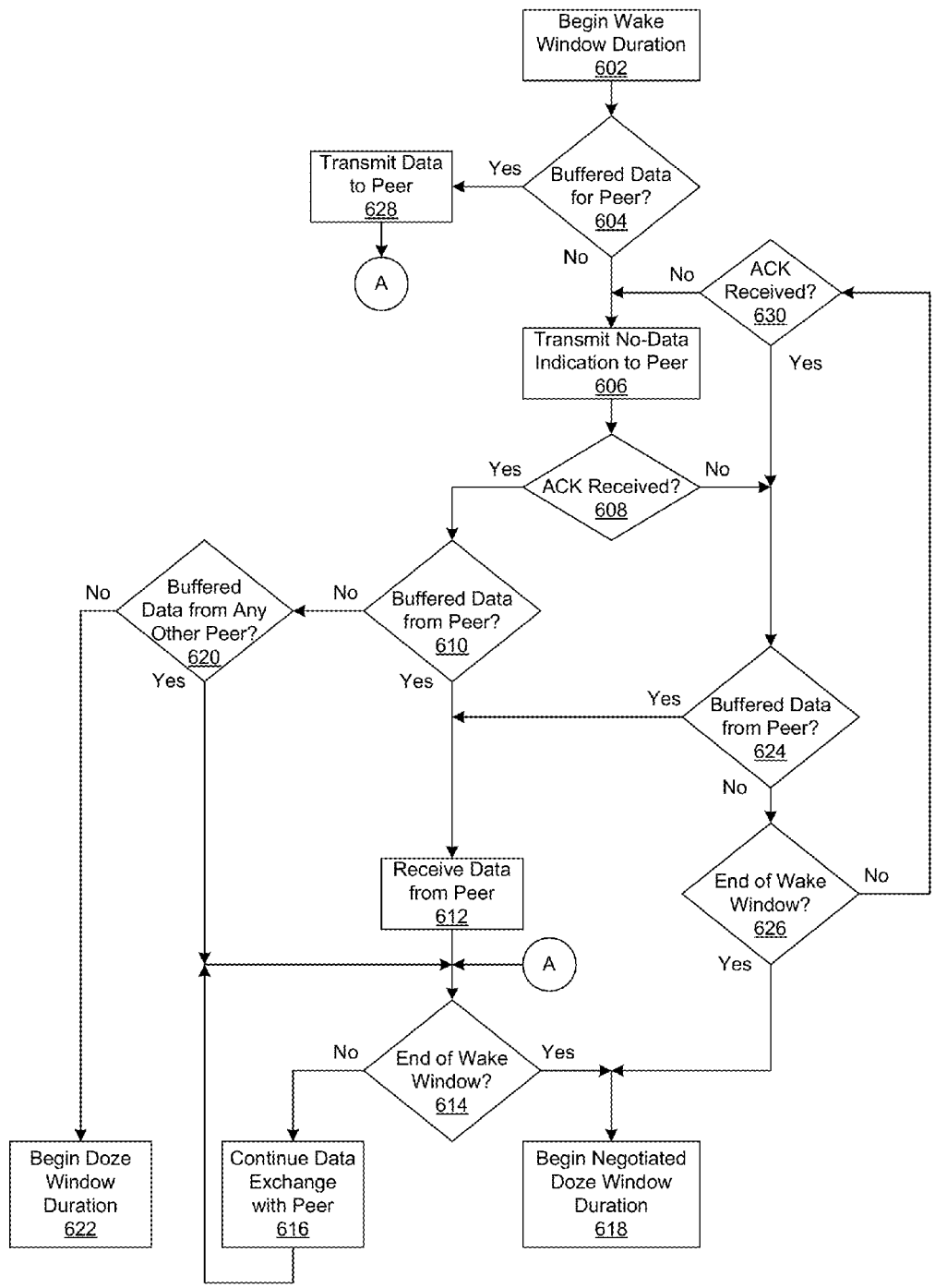
FIG. 6 is a flowchart illustration of exemplary steps for power state determination for a STA that sends a QoS null frame, in accordance with an embodiment of the invention.

FIG. 6 is a flowchart illustration of exemplary steps for power state determination for a STA that sends a QoS null frame, in accordance with an embodiment of the invention.

The exemplary narrative presented in FIG. 6 is one in which STA 124 enters the active state and determines whether it has data to transmit to STA 126. STA 124 remains in the active state or enters the doze state based on communication with STA 126.

Referring to FIG. 6, in step 602, STA 124 may begin a wake window duration. At the beginning of the wake window duration, STA 124 may exit the doze state and enter the active state. In step 604, STA 124 may determine whether it has buffered data to transmit to STA 126. The buffered data may comprise data that was generated during a preceding doze time duration and stored by STA 124 for transmission to STA 126 during a subsequent wake window time duration. In the event that, at step 604, STA 124 determines that it does not have buffered data to transmit to STA 126, in step 606, STA 124 may transmit a No-Data Indication message to STA 126. In an exemplary embodiment of the invention, the No-Data Indication message may comprise a QoS null frame. If before step 606, STA 124 receives from STA 126 a data frame (including a QoS null frame) whose EOSP field 376 is set to 1, STA 124 switches to step 704 in FIG. 7 and may cancel its pending transmission of the No-Data Indication message and take the role of STA 126. In step 608, STA 124 may determine whether an ACK message has been received in response to the transmitted No-Data Indication message. In the event that, at step 608, STA 124 determines that an ACK message has been received, in step 610, STA 124 may determine whether STA 126 has buffered data to transmit to STA 124. In the event, at step 610, STA 124 determines that STA 126 does not have any data to transmit to STA 124, in step 620, STA 124 may determine whether any other peer STA has buffered data to transmit to STA 124. In the event that, at step 620, STA 124 determines that no other peer STA has buffered data to transmit to STA 124, in step 622, STA 124 may being a doze window duration. During a doze window duration, STA 124 may enter the doze state.

In the event that, at step 604, STA determines that it has buffered data to transmit to STA 126, in step 628, STA 124 may transmit the buffered data to STA 126. In this event, STA 124 may remain in the active state until at least the end of the negotiated wake window time duration. Following step 628, at step 614, STA 124 may determine whether the current negotiated wake window time duration has ended. In the event that, at step 614, the current negotiated wake window time duration has not ended, at step 616, STA 124 may continue to exchange data with STA 126. Step 614 may follow step 616. In the event that, at step 614, the current negotiated wake window time duration has ended, at step 618, STA 124 may begin a negotiated doze window duration. The negotiated doze window duration represents a time duration, which follows the negotiated wake window duration, during the current wake interval time duration. During the negotiated doze window duration, STA 124 may exit the active state and enter the doze state.

In the event that, at step 608, STA 124 determines that an AC message has not been received, at step 624, STA 124 may determine whether STA 126 has transmitted data to STA 124. In the event that, at step 624, STA 124 determines that STA 126 has transmitted data to STA 124, in step 612, STA 124 may receive the data from STA 126. STA 124 may remain in the active state until at least the end of the current negotiated wake window time duration. Step 614 may follow step 612.

In the event that, at step 624, STA 124 has not determined that STA 126 has transmitted data to STA 124, STA 124 may continue to wait to receive an ACK frame from STA 126 until at least the end of the current negotiated wake window time duration. At step 626, STA 124 may determine whether the current negotiated wake window time duration has ended. In the event that, at step 626, STA 124 has determined that the current negotiated wake window time duration has ended, STA 124 may discard the no-Data Indication message if it has not been successfully transmitted, and step 618 may follow step 626. In the event that, at step 626, STA 124 determines that the current negotiated wake window time duration has not ended, at step 630, STA 124 may determine whether an ACK message has been received from STA 126 in response to a previously transmitted No-Data Indication message.

In the event that, at step 630, STA 124 determines that an ACK message has been received, step 624 may follow step 630. In the event that, at step 630, STA 124 determines that an ACK message has not been received, STA 124 may retransmit the No-Data Indication message to STA 126. In this event, step 606 may follow step 606. In various embodiments of the invention, STA 124 may limit the number of retransmission of the No-Data Indication to a predetermined number of retransmissions. In the event that an ACK is not received after STA 124 has retransmitted the No-Data Indication message for the predetermined number of retransmissions, STA 124 may remain in the active state until at least the end of the current negotiated wake window time duration.

In the event that, at step 620, STA 124 determines that one or more other peer STAs has buffered data to transmit to STA 124 may remain in the active state until at least the end of the current negotiated wake window time duration. Step 614 may follow step 620.

Figure 7:
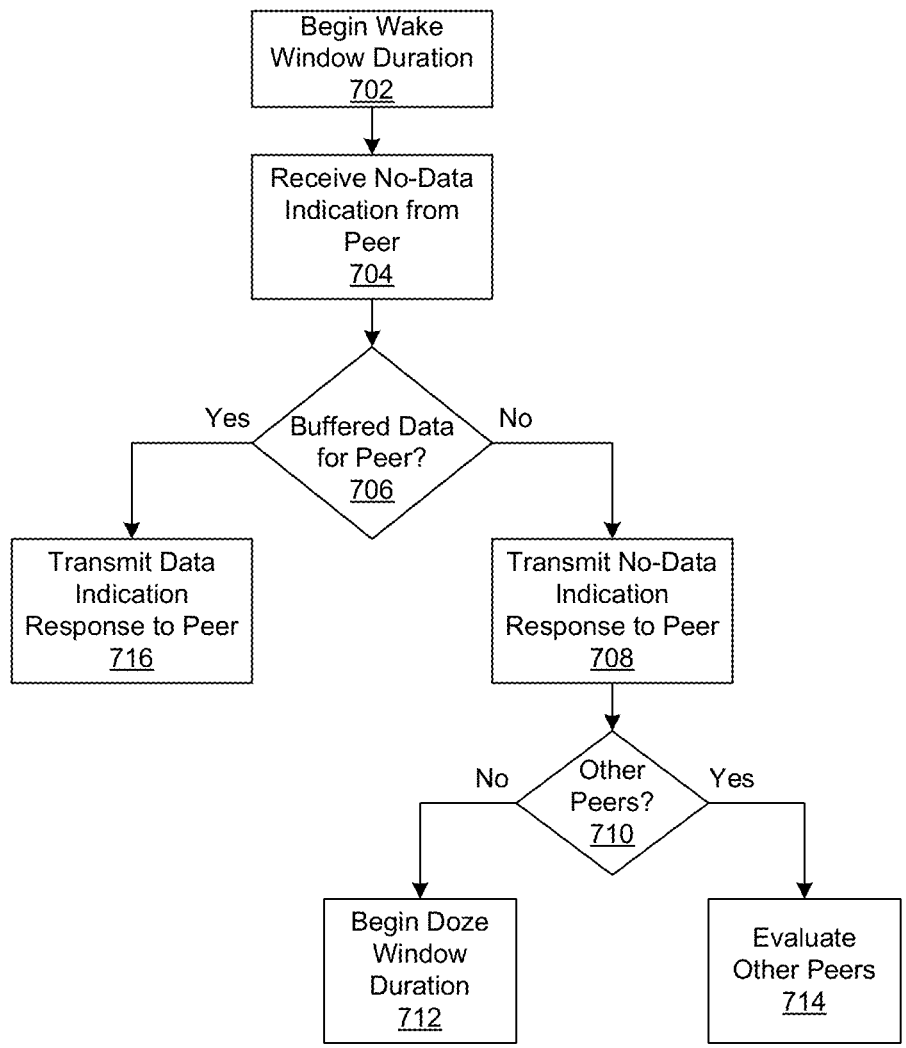
FIG. 7 is a flowchart illustration of exemplary steps for power state determination for a STA that receives a QoS null frame, in accordance with an embodiment of the invention.

FIG. 7 is a flowchart illustration of exemplary steps for power state determination for a STA that receives a QoS null frame, in accordance with an embodiment of the invention. The exemplary narrative presented in FIG. 7 is one in which STA 126 enters the active state receives a QoS null frame from STA 124. STA 126 determines whether to remain in the active state based on whether it has data to transmit to STA 124.

Referring to FIG. 7, in step 702, STA 126 may begin a wake window duration. At the beginning of the wake window duration, STA 126 may exit the doze state and enter the active state. In step 704, STA 126 may receive a No-Data Indication message from STA 124. In an exemplary embodiment of the invention, the No-Data Indication message may comprise a QoS null frame. In step 706, STA 126 may determine whether it has buffered data to transmit to STA 124. In the event that, at step 706, STA 126 determines that it has data to transmit to STA 124, at step 716, STA 126 may transmit a Data Indication Response message to STA 124. In an exemplary embodiment of the invention, the Data Indication Response message may comprise an ACK frame, which comprises an indication that STA 126 has data to transmit to STA 124.

In the event that, at step 706, STA 126 determines that it has no data to transmit to STA 124, at step 708, STA 126 may transmit a No-Data Indication Response message to STA 124. In an exemplary embodiment of the invention, the Data Indication Response message may comprise an ACK frame, which comprises an indication that STA 126 has no data to transmit to STA 124. In step 710, STA 126 may determine whether there are other peer STAs. In the event that, at step 710, STA 126 determines that there are no other peer STAs, at step 712, STA 126 may begin a doze window time duration. During a doze window duration, STA 126 may enter the doze state.

In the event that, at step 710, STA 126 determines that there are one or more remaining peer STAs, at step 714, STA 126 may evaluate each of the remaining peer STAs. In the event that STA 126 determines that there is data to exchange with one or more of the remaining peer STAs, STA 126 may remain in the active state until at least the end of the current wake window time duration. In the event that STA 126 determines that there is no data to exchange with any of the remaining peer STAs, STA 126 may being a doze window time duration.

In various embodiments of the invention a STA may practice one or more of the exemplary steps shown in FIG. 6 and/or FIG. 7, either sequentially or concurrently.

Another embodiment of the invention may provide a non-transitory computer readable medium, having stored thereon, a computer program having at least one code section executable by a computer, thereby causing the causing to perform the steps as described herein for no buffered traffic indication for WLAN power save.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for power control, the method comprising:
   establishing a peer relationship with one or more peer communication devices based on establishing an association with a distinct coordinating communication device;
   entering into a low-power operating state;
   waking up and determining that there is no buffered data to transmit to said one or more peer communication devices;
   transmitting a no-data indication message to each of said one or more peer communication devices while operating in an active operating state;
   receiving an acknowledgment message from said each of said one or more peer communication devices based on said transmitted no-data indication messages; and
   upon determining that each of the received acknowledgment messages has a no-data indication, entering the low power operating state.

2. The method according to claim 1, further comprising remaining in the active operating state upon determining that at least one of said one or more peer communication devices has data to transmit.

3. The method according to claim 2, comprising remaining in said active operating state based on determining that at least one of the received acknowledgment messages not having a no-data indication.

4. The method according to claim 1, comprising determining that none of said one or more peer communication devices has data to transmit based on each of said received acknowledgment messages having a no-data indication.

5. The method according to claim 4, comprising entering said low power operating state based on said determining that none of said one or more peer communications devices has data to transmit.

6. A system for power control, the system comprising:
   one or more circuits that enable establishment of a peer relationship with one or more peer communication devices based on establishment of an association with a distinct coordinating communication device;
   said one or more circuits operable to:
      enter into a low-power operating state;
      wake up and determine that there is no buffered data to transmit to any of said one or more peer communication devices; and
      enable transmission of a no-data indication message to each of said one or more peer communication devices while operating in an active operating state;
   said one or more circuits enable reception of an acknowledgment message from said each of said one or more peer communication devices based on said transmitted no-data indication messages, each of the received acknowledgment messages indicating whether a corresponding peer communication device has data to transmit; and
   said one or more circuits enable entry into the low-power operating state upon determining that none of the one or more peer communication devices has data to transmit.

7. The system according to claim 6, wherein said one or more circuits enable determining that there is no data to transmit to said one or more peer communication devices.

8. The system according to claim 7, wherein said one or more circuits enable generation of said no-data indication messages based on said determining that there is no data to transmit to said one or more peer communication devices.

9. The system according to claim 6, wherein said one or more circuits enable remaining in the active operating state upon determining that at least one of said one or more peer communication devices has data to transmit based on content of said received acknowledgment messages.

10. The system according to claim 6, wherein said one or more circuits enable remaining in said active operating state upon determining that at least one of said one or more peer communication devices has data to transmit.

11. The system according to claim 6, wherein said one or more circuits enable entering said low power operating state based on each of said received acknowledgment messages including a no-data indication.

12. A system for power control, comprising:
   a wireless transceiver configured to communicate with a base station and with one or more peer communication devices;
   wherein the wireless transceiver is operable to:
      enter into a low-power operating state for a specified period;

wake up and determine that there is no buffered data to transmit to any of said one or more peer communication devices; and transmit a no-data indication message to each of said one or more peer communication devices while operating in an active operating state;

wherein the wireless transceiver is operable to receive and process an acknowledgment message including a no-data indication from said each of the one or more peer communication devices based on the transmitted no-data indication messages; and wherein the wireless transceiver is operable to determine to enter the low power operating state based on receiving the acknowledgment messages with the included no-data indications.

13. The system according to claim 12, wherein the wireless transceiver is operable to determine that there is no data to transmit to the one or more peer communication devices.

14. The system according to claim 12, wherein the wireless transceiver is operable, in the active operating state, to transmit the no-data indication message to each of said one or more peer communication devices regardless of whether it had been transmitting data or messages.

15. The system according to claim 12, wherein the wireless transceiver is operable to determine that at least one of the one or more peer communication devices has data to transmit based upon a lack of a no-data indication in at least one of the received acknowledgment messages.

16. The system according to claim 12, wherein the wireless transceiver is operable to determine to not transition to the low power operating state based upon a lack of a no-data indication in at least one of the received acknowledgment messages.

17. The system according to claim 12, wherein the wireless transceiver is operable to determine to transition to the low power operating state based on content of at least one of the received acknowledgment messages including a no-data indication.

18. The system according to claim 12, wherein the wireless transceiver is operable to enter the low power operating state for a limited duration and, upon exiting the low power operating state after the limited duration, to subsequently transmit another no-data indication message to each of said one or more peer communication devices upon determining that there is no buffered data to transmit to any of said one or more peer communication devices.

19. The method of claim 1, wherein the method for power control supports a wireless personal area network.

20. The system of claim 12, wherein the system for power control supports a wireless personal area network.

* * * * *